(12) United States Patent
Nakazaki et al.

(10) Patent No.: US 10,933,769 B2
(45) Date of Patent: Mar. 2, 2021

(54) LOAD DETECTION SENSOR UNIT

(71) Applicant: Fujikura Ltd., Tokyo (JP)

(72) Inventors: Shigeru Nakazaki, Tokyo (JP);
Tetsuya Kawahira, Tokyo (JP);
Naohiro Kikukawa, Sakura (JP);
Takashi Kameshima, Sakura (JP)

(73) Assignee: FUJIKURA LTD., Tokyo (JP)

( * ) Notice: Subject to any disclaimer, the term of this patent is extended or adjusted under 35 U.S.C. 154(b) by 296 days.

(21) Appl. No.: 16/074,510

(22) PCT Filed: Nov. 4, 2016

(86) PCT No.: PCT/JP2016/082852

§ 371 (c)(1),
(2) Date: Aug. 1, 2018

(87) PCT Pub. No.: WO2017/145446

PCT Pub. Date: Aug. 31, 2017

(65) Prior Publication Data

US 2020/0290483 A1    Sep. 17, 2020

(30) Foreign Application Priority Data

Feb. 22, 2016 (JP) ............................. JP2016-031526
Jul. 26, 2016 (JP) ............................. JP2016-146807

(51) Int. Cl.
*H01H 3/14* (2006.01)
*B60R 21/015* (2006.01)
(Continued)

(52) U.S. Cl.
CPC ................ *B60N 2/002* (2013.01); *A47C 7/62* (2013.01); *B60N 2/7094* (2013.01);
(Continued)

(58) Field of Classification Search
CPC ......... G01L 1/205; G01L 1/142; H01H 13/78; H01H 2201/038; H01H 2205/016;
(Continued)

(56) References Cited

U.S. PATENT DOCUMENTS 5,896,090 A    4/1999  Okada et al.
8,186,233 B2*  5/2012  Joung .................... H01C 10/10
                                                 73/862.68
(Continued)

FOREIGN PATENT DOCUMENTS

CA    2527887 A1    12/2004
CN    1812735 A      8/2006
(Continued)

OTHER PUBLICATIONS

International Search Report dated Jan. 31, 2017, issued in counterpart application No. PCT/JP2016/082852. (2 pages).
(Continued)

*Primary Examiner* — Brandi N Hopkins
(74) *Attorney, Agent, or Firm* — Westerman, Hattori, Daniels & Adrian, LLP

(57) ABSTRACT

A load detection sensor unit 1A includes: a load detection sensor 5 that has a sensor sheet 50 having a pair of resinous insulating sheets 56s and 57s, a first electrode 56e provided on a surface of one insulating sheet 56s, and a second electrode 57e forming a pair with the first electrode 56e, and a metal plate 60 provided in at least a portion overlapping with the first electrode 56e and the second electrode 57e on one surface of the sensor sheet 50; and a pressing member 4 that has a pressing portion 46 disposed on the side of the metal plate 60 opposite to the side of the sensor sheet 50 and pressing the metal plate 60. The pressing portion 46 is harder than the seat cushion SC and the sensor sheet 50 and the metal plate 60 are bonded by an adhesive layer 70.

17 Claims, 7 Drawing Sheets

(51) Int. Cl.
*B60N 2/00* (2006.01)
*A47C 7/62* (2006.01)
*B60N 2/70* (2006.01)
*H01H 13/16* (2006.01)

(52) U.S. Cl.
CPC ....... *B60R 21/01516* (2014.10); *H01H 3/141* (2013.01); *H01H 13/16* (2013.01)

(58) Field of Classification Search
CPC ....... H01H 2225/018; H01H 2203/038; H01H 13/807; H01H 2215/004; H01H 2225/03; H03K 17/9625; H01C 10/10; H04M 1/23; G01G 19/08; B60N 2/64; B60R 21/01524
See application file for complete search history.

(56) References Cited

U.S. PATENT DOCUMENTS

| | | | | |
|---|---|---|---|---|
| 9,533,603 | B2* | 1/2017 | Kordel | ................ A61G 5/1091 |
| 9,776,530 | B2* | 10/2017 | Boyer | ................ B60N 2/7094 |
| 2006/0091708 | A1 | 5/2006 | Zenba et al. | |

FOREIGN PATENT DOCUMENTS

| | | |
|---|---|---|
| CN | 202896500 U | 4/2013 |
| CN | 103582438 A | 2/2014 |
| CN | 206406777 U | 8/2017 |
| EP | 1634516 A1 | 3/2006 |
| EP | 2 727 497 A1 | 5/2014 |
| JP | 55-143761 U | 10/1980 |
| JP | 9-315199 A | 12/1997 |
| JP | 2002-228516 A | 8/2002 |
| JP | 2005-112335 A | 4/2005 |
| JP | 2007-132888 A | 5/2007 |
| JP | 2008-146679 A | 6/2008 |
| JP | 2011-105278 A | 6/2011 |
| JP | 2012-121363 A | 6/2012 |
| WO | 98/29849 A2 | 7/1998 |
| WO | 2004/107919 A1 | 12/2004 |
| WO | 2013002289 A1 | 1/2013 |

OTHER PUBLICATIONS

Office Action dated Feb. 14, 2019, issued in counterpart CN application No. 201611166473.4, with English translation. (8 pages).
Office Action dated May 14, 2019, issued in counterpart JP Application No. 2018-500985, with English machine translation. (10 pages).
Office Action dated Aug. 28, 2018, issued in counterpart Chinese Application No. 201611166473.4, with English translation. (17 pages).
Extended Search Report dated Sep. 24, 2019, issued in counterpart EP Application No. 16891602.1 (8 pages).

* cited by examiner

LOAD DETECTION SENSOR UNIT

TECHNICAL FIELD

The present invention relates to a load detection sensor unit and is suitable for appropriately detecting seating or the like.

BACKGROUND ART

As one of safety systems in vehicles, an alarm system for warning that a seat belt is not worn at the time of getting on a vehicle is put to practical use. In the alarm system, a warning is issued when wearing of the seat belt is not detected in a state where seating of a person is detected. As a device to detect seating of the person, a seating detection device to detect a load due to seating may be used.

The case where a load detection sensor with a configuration in which a spacer provided with an opening is disposed between a pair of resin films and electrodes formed on the respective films face each other at a predetermined interval in the opening of the spacer is used as the seating detection device is known (refer to the following Patent Literature 1).

[Patent Literature 1] JPH09-315199 A

SUMMARY OF INVENTION

However, in general, the resin film tends to be bent with weak force, because a strength of the resin film decreases when a temperature increases. Therefore, if the resin film is placed in a high-temperature environment as in the vehicle in the scorching sun, the strength of the resin film may decrease. In this case, even if a load lighter than a load of a normal person is applied to a seat device, this may be erroneously detected as seating.

Accordingly, an object of the present invention is to provide a load detection sensor unit that is capable of appropriately detecting a load applied according to seating or the like.

To solve the above problems, the present invention provides a load detection sensor unit that is disposed below a seat cushion. The load detection sensor unit includes: a load detection sensor that has a sensor sheet having a pair of resinous insulating sheets, a first electrode provided on one of surfaces facing each other in the pair of insulating sheets, and a second electrode disposed between the pair of insulating sheets and forming a pair with the first electrode, and a metal plate provided in at least a portion overlapping with the first electrode and the second electrode on one surface of the sensor sheet; and a pressing member that has a pressing portion disposed on the side of the metal plate opposite to the side of the sensor sheet and pressing the metal plate. The pressing portion is harder than the seat cushion and the sensor sheet and the metal plate are bonded by an adhesive layer.

In the load detection sensor unit, when the metal plate is pressed by the pressing portion, the metal plate is bent, the sensor sheet made of a resin is bent, the first electrode and the second electrode contact each other or a resistance value or an electrostatic capacitance value between the first electrode and the second electrode changes, the load detection sensor is turned on, and a load is detected.

Because the pressing portion is harder than the seat cushion and the metal plate is pressed by the pressing portion, the metal plate can be appropriately bent as compared with the case where the metal plate is pressed directly by the seat cushion, and seating can be appropriately detected. In addition, a metal is less likely to cause creeping as compared with the resin. For this reason, even when the metal plate is pressed by the pressing portion, it is difficult for the metal plate to acquire a pressing habit. Therefore, in the load detection sensor unit, erroneous detection of the load applied according to the seating or the like due to the pressing habit can be suppressed and as a result, the load applied according to the seating or the like can be appropriately detected.

Incidentally, in the resin, because flexibility changes easily according to a change in environmental temperature as compared with the metal, creeping tends to occur easily and the acquisition of the bending habit tends to occur easily. However, in the load detection sensor unit, the metal and one surface of the sensor sheet made of the resin are bonded by the adhesive layer. For this reason, when pressing by the pressing portion is released and the metal plate returns to a position at the time of non-pressing, the metal plate can return the sensor sheet made of the resin to the position. Therefore, in the load detection sensor unit, even when the environmental temperature around the load detection sensor unit changes, it is difficult for the sensor sheet made of the resin to acquire the bending habit and the erroneous detection of the load applied according to the seating or the like due to the pressing habit can be suppressed. As a result, the load applied according to the seating or the like can be appropriately detected.

The load detection sensor unit may further include a pedestal on which a block larger than at least the first electrode and the second electrode in the sensor sheet is disposed.

Preferably, in the sensor sheet, a circumferential portion of at least a region overlapping with the first electrode and the second electrode in a pedestal facing surface to be a surface opposite to a surface to which the metal plate is attached and facing the pedestal is not adhered to the pedestal.

When the sensor sheet disposed on the pedestal is adhered to the pedestal, an adhesive portion of the sensor sheet is hardly deformed even if it is pressed by bending of the metal plate and only the upper side of the sensor sheet tends to be locally deformed. Meanwhile, in the case where a circumferential portion to be at least a peripheral portion of the region overlapping with the first electrode and the second electrode in the pedestal facing surface of the sensor sheet is not adhered to the pedestal, the circumferential portion is easily deformed to float, when the circumferential portion is pressed by the bending of the metal plate. Therefore, in this case, at least the peripheral portion of the first electrode and the second electrode is easily deformed to follow the bending of the metal plate and as a result, the load applied according to the seating or the like can be appropriately detected.

Preferably, in the sensor sheet disposed on the pedestal, the entire pedestal facing surface is not adhered to the pedestal.

In this case, because the entire sensor sheet disposed on the pedestal is easily deformed to follow the bending of the metal plate, the sensor sheet can be easily deformed to further follow the metal plate at the time of the pressing.

Preferably, in the sensor sheet disposed on the pedestal, the region is adhered to the pedestal and the entire pedestal facing surface other than the region is not adhered.

When the region overlapping with the first electrode and the second electrode is adhered, a misalignment of the sensor sheet with respect to the pedestal is suppressed. For this reason, it is possible to suppress relative positions of the sensor sheet and the metal plate from shifting due to the misalignment of the sensor sheet with respect to the pedestal. Therefore, it is possible to suppress a failure in which the load detection sensor is not turned on, even when the metal plate is pressed by the pressing portion. On the other hand, because the entire portion other than the region overlapping with the first electrode and the second electrode is not adhered, the sensor sheet can be easily deformed to follow the bending of the metal plate at the time of the pressing as described above.

Preferably, the load detection sensor unit further includes a movement regulation member that regulates a relative movement of the sensor sheet and the pedestal in a direction of the pedestal facing surface.

In this case, even if the entire sensor sheet disposed on the pedestal is not adhered, the misalignment of the sensor sheet with respect to the pedestal is suppressed. Therefore, it is possible to suppress the failure in which the load detection sensor is not turned on, even when the metal plate is pressed by the pressing portion.

Preferably, the movement regulation member is inserted into through-holes formed in the sensor sheet and the pedestal.

In this case, the misalignment of the sensor sheet with respect to the pedestal is easily suppressed.

Preferably, the movement regulation member is a part of the pressing member.

In this case, because a deviation of a positional relation between the pressing portion and the first electrode and the second electrode is suppressed, it is possible to suppress the failure in which the load detection sensor is not turned on, even when the load detection sensor is pressed by the pressing portion.

Preferably, the pressing member has a top wall that has an area larger than a contact area of the pressing portion with respect to the metal plate and receives the pressing force from the seat cushion.

Because the area of the top wall receiving the pressing force from the seat cushion is larger than the area of the pressing portion contacting the metal plate, the pressing force from the seat cushion can be concentrated on the pressing portion by the top wall and the metal plate can be more appropriately bent. Therefore, the load can be more appropriately detected.

Preferably, the top wall has a larger area than the first electrode and the second electrode and the pressing portion has a smaller area than the first electrode and the second electrode.

The pressing portion has the smaller area than the first electrode and the second electrode, so that the pressing force concentrated by the top wall of the pressing member can be transmitted to the first electrode and the second electrode without being dispersed to the pressing portion.

Preferably, a thickness of the adhesive layer is 10 µm or more and is 0.8 times or less of a thickness of the insulating sheet contacting the adhesive layer in the pair of insulating sheets.

In this case, it is possible to appropriately detect the load even in a high-temperature environment or a low-temperature environment.

Preferably, a tip of the pressing portion has a convex curved surface shape.

In this case, the pressing force applied from the pressing portion to the load detection sensor can be concentrated, as compared with the case where the tip has a planar shape. Therefore, even in a state where the pressing force received from the pressing portion is difficult to transmit to the load detection sensor, such as when the metal plate in the load detection sensor becomes thick, the load can be appropriately detected.

Preferably, a tip of the pressing portion has a planar shape.

In this case, the pressing force received by the load detection sensor from the pressing portion is dispersed as compared with the case where the tip has a convex curved surface shape, so that the adhesive layer bonding the sensor sheet and the metal plate in the load detection sensor hardly escapes laterally by pressing of the pressing portion. Therefore, it is difficult for the adhesive layer to acquire the pressing habit. As a result, acquisition of the pressing habit in the metal plate is also reduced by making the metal plate follow the adhesive layer.

Preferably, the sensor sheet further has a spacer provided with openings corresponding to the pair of electrodes between the pair of insulating sheets and an area of the planar shape of the tip of the pressing portion is 3.0 mm$^2$ or more and is 0.8 times or less of an area of the opening.

When an excessive load is applied like when a heavy man sits, the excessive force is applied to the metal plate from the pressing portion and a portion of the metal plate pressed by the pressing portion may cause plastic deformation. In this case, the load cannot be appropriately detected. Meanwhile, an area of the planar shape of the tip of the pressing portion is 3.0 mm$^2$ or more and is 0.8 times or less of an area of the opening, so that the failure in which the pressing force is excessively dispersed and the load detection sensor is not turned on can be prevented while the plastic deformation of the portion of the metal plate pressed by the pressing portion is further suppressed.

As described above, according to the present invention, a load detection sensor unit that is capable of appropriately detecting a load applied according to seating or the like is provided.

DESCRIPTION OF EMBODIMENTS

Preferred embodiments of a load detection sensor unit according to the present invention will be described in detail below with reference to the drawings. To facilitate understanding, scales of the respective drawings and scales described in the following description may be different from each other.

(1) First Embodiment

Figure 1:
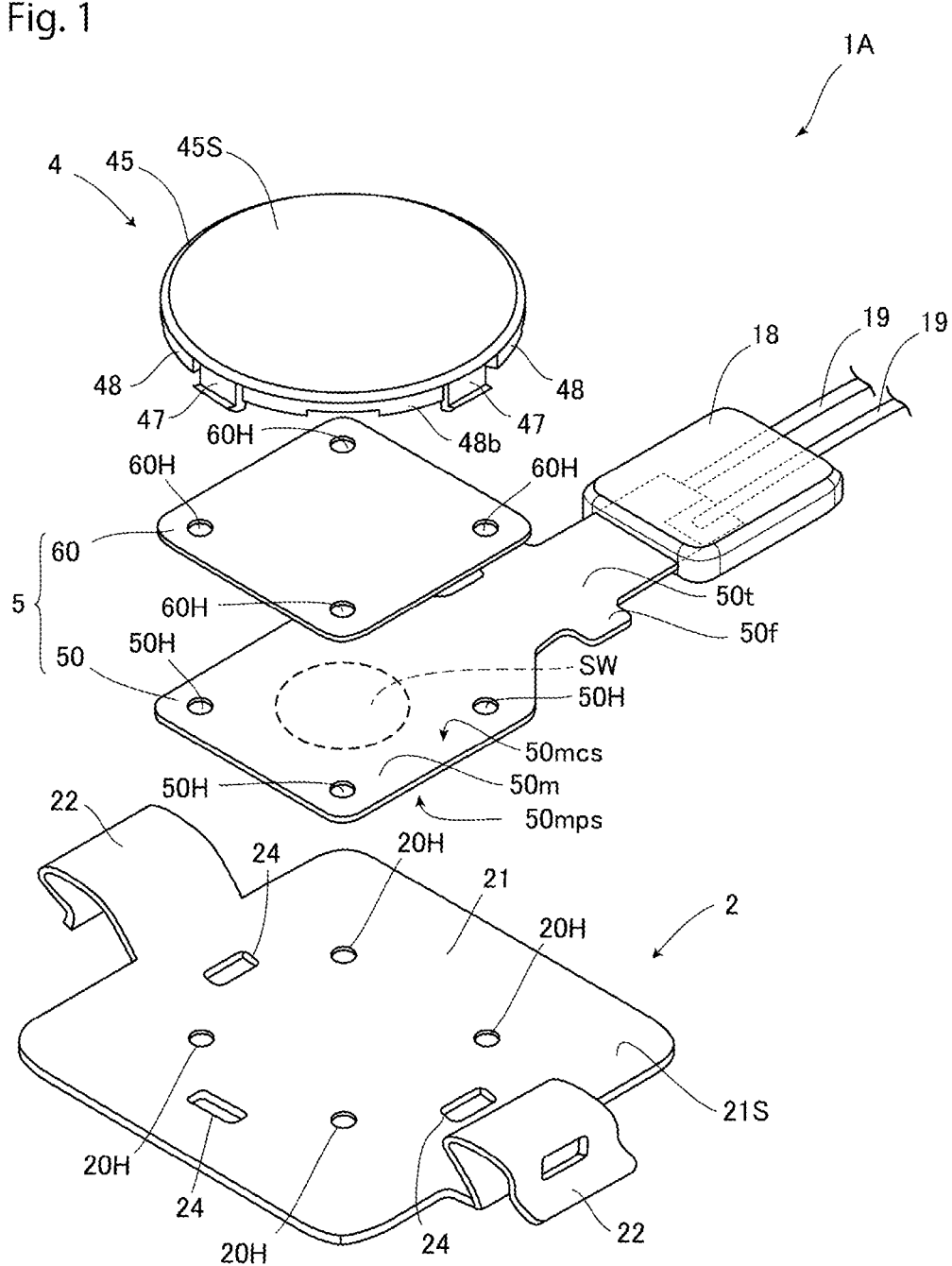
FIG. 1 is an exploded view showing a configuration of a load detection sensor unit according to a first embodiment.
Figure 2:
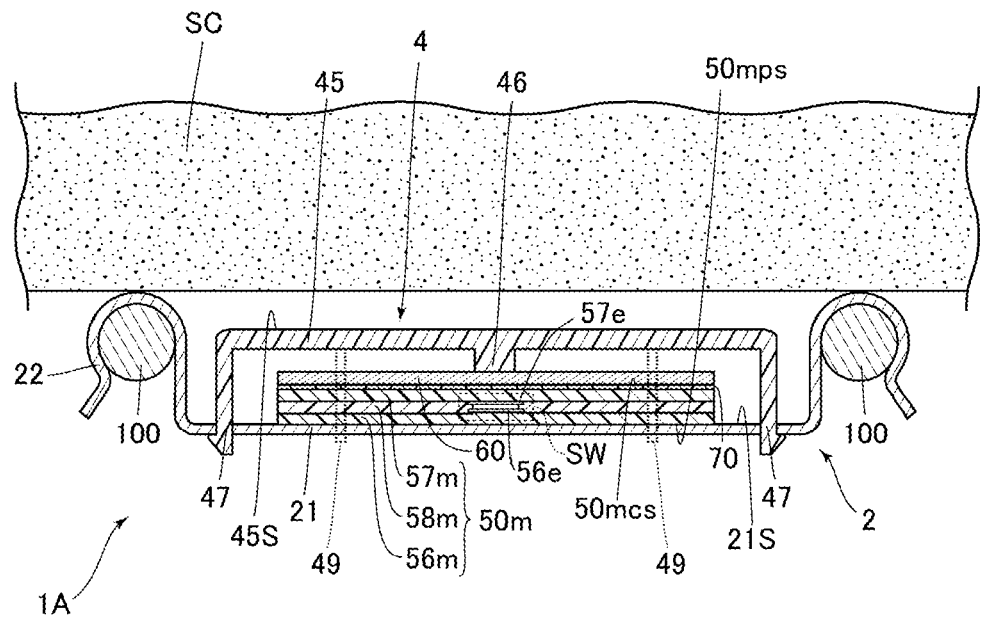
FIG. 2 is a cross-sectional view showing an aspect where the load detection sensor unit is attached to an S spring.

FIG. 1 is an exploded view showing a configuration of a load detection sensor unit according to a first embodiment and FIG. 2 is a cross-sectional view showing an aspect where the load detection sensor unit is attached to an S spring of a seat device. FIG. 2 is a cross-sectional view of the load detection sensor unit in a surface along a horizontal direction of the seat device. As shown in FIGS. and 2, a load detection sensor unit 1A includes a pedestal 2, a pressing member 4, and a load detection sensor 5 as a main configuration.

The load detection sensor 5 includes a flexible sensor sheet 50 that has a switch SW including a first electrode 56e and a second electrode 57e, a metal plate 60, and an adhesive layer 70 to adhere the sensor sheet 50 and the metal plate 60 to each other. By the adhesive layer 70, the sensor sheet 50 and the metal plate 60 are bonded.

The sensor sheet 50 is a sheet-like membrane switch and has a substantially rectangular main block 50m and a tail block 50t connected to the main block 50m and narrower than the main block 50m. The main block 50m is provided with the switch SW including the first electrode 56e and the second electrode 57e. In addition, a wide blade portion 50f is formed in the tail block 50t. In addition, through-holes 50H are formed in the vicinity of respective apexes of the main block 50m.

As shown in FIG. 2, the metal plate 60 is attached to one surface of the sensor sheet 50 by the adhesive layer 70. In this embodiment, the metal plate 60 is attached to a cushion side surface 50mcs to be a surface at the side of a seat cushion SC of a seat device, in the main block 50m to be a part of the sensor sheet 50. A region overlapping with the first electrode 56e and the second electrode 57e of the sensor sheet 50 in a direction orthogonal to the cushion side surface 50mcs is included in the cushion side surface 50mcs and the metal plate 60 is attached to the cushion side surface 50mcs including the region. That is, when the cushion side surface 50mcs is viewed from the front, the first electrode 56e and the second electrode 57e are located at the inner side than a range surrounded by a side surface of the metal plate 60 in a direction orthogonal to a thickness direction of the metal plate 60.

The adhesive layer 70 is a layered member that bonds the sensor sheet 50 and the metal plate 60 to each other. The adhesive layer 70 may be provided in an entire portion between the sensor sheet 50 and the metal plate 60 or may be provided in a part thereof. However, when the adhesive layer 70 is provided in the part between the sensor sheet and the metal plate 60, the adhesive layer 70 is provided in at least a region overlapping with a pressing portion 46 of the pressing member 4 described later in the thickness direction. Also, the adhesive layer 70 is preferably provided in a region overlapping with the first electrode 56e and the second electrode 57e in the thickness direction. A material of the adhesive layer 70 may be any material that can bond the sensor sheet 50 and the metal plate 60 to each other. However, examples of the material of the adhesive layer 70 include a thermoplastic resin, a thermosetting resin, a photocurable resin, and the like. As the adhesive layer 70, an adhesive layer may be formed on both surfaces of a base material such as polyethylene terephthalate (PET) or non-woven fabric. Here, a glass transition point Tg of the adhesive layer 70 is preferably 85° C. or more. By setting the glass transition point Tg to 85° C. or more, it is difficult for the adhesive layer 70 to flow even in a high-temperature environment as in a vehicle in the scorching sun, so that erroneous detection of seating due to the flow of the adhesive layer 70 can be suppressed.

The pedestal 2 has a placement portion 21 on which the load detection sensor 5 is placed and a pair of hook portions 22 which is connected to the placement portion 21. A top surface of the placement portion 21 is a placement surface 21S. The main block 50m is disposed on the placement surface 21S. As shown in FIG. 2, in the main block 50m, an entire pedestal facing surface 50mps to be a surface facing the placement surface 21S of the placement portion 21 does not adhere to the placement portion 21 and the placement surface 21S and the pedestal facing surface 50mps contact each other. In addition, in the placement portion 21, a plurality of through-holes 20H (FIG. 1) penetrating from the placement surface 21S to a bottom surface (surface opposite to the placement surface 21S) of the placement portion 21 are formed and a plurality of hook openings 24 (FIG. 1) are formed.

The pair of hook portions 22 is respectively provided at positions facing each other with the placement portion 21 therebetween and are respectively fitted into a pair of S springs 100 to adjacent to each other, among a plurality of S springs 100 (FIG. 2) arranged and stretched in openings of a frame in the seat device of the vehicle. Therefore, each hook portion 22 is a locking portion that locks the pedestal 2 to the S spring 100. In this embodiment, the pair of hook portions 22 is formed to be arranged in a horizontal direction of the seat device and to be fitted into the pair of S springs 100 adjacent to each other in the horizontal direction. In a state where the pair of hook portions 22 is fitted in the pair of S springs 100 adjacent to each other as described above, the placement portion 21 is located below the seat cushion SC (FIG. 2) placed on the plurality of S springs 100 and when the plurality of S springs are viewed from the upper side, the placement portion 21 is disposed between the pair of S springs 100. As described above, in a state where the pair of hook portions 22 is fitted in the pair of S springs 100, in this embodiment, the placement surface 21S is located lower than a lower end portion of each S spring 100. In the case of this embodiment, the pedestal 2 is obtained by molding a metal plate and a plate thickness in this case is, for example, 0.8 mm.

The pressing member 4 is a member that covers the main block 50m placed on the placement surface 21S of the placement portion 21 and protects the first electrode 56e and the second electrode 57e of the main block 50m. As shown in FIG. 2, the pressing member 4 is also a pressing member that is pressed by the seat cushion SC and presses the switch SW including the first electrode 56e and the second electrode 57e of the load detection sensor 5.

The pressing member 4 has a top wall 45 and a frame wall 48. The top wall 45 is a plate-like member that is formed in a substantially circular shape. In addition, the frame wall 48 of the pressing member 4 is divided into a plurality of parts and connected to outer circumference of the top wall 45. Hook pieces 47 are connected to the top wall 45 between the plurality of divided frame walls 48. Each of the hook pieces 47 is constituted to be fitted into the hook opening 24 formed in the placement portion 21 of the pedestal 2. By fitting each hook piece 47 into the hook opening 24, a relative movement of the pedestal 2 and the pressing member 4 in a direction of the placement surface 21S is regulated.

Figure 3:
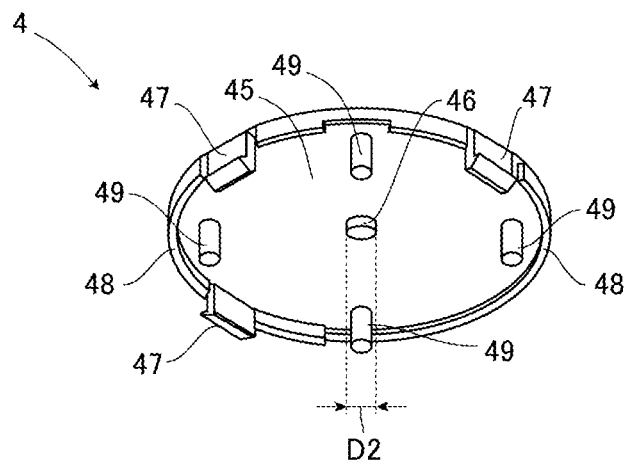
FIG. 3 is a diagram showing a pressing member from a viewpoint different from FIG. 1.

FIG. 3 is a diagram showing the pressing member 4 from a viewpoint different from FIG. 1. As shown in FIG. 3, the top wall 45 of the pressing member 4 is provided with the pressing portion 46 that protrudes from a bottom surface facing the placement portion 21 of the pedestal 2. In the case of this embodiment, a tip of the pressing portion 46 has a planar shape and the plane is substantially circular. The pressing portion 46 has a smaller area than the first electrode 56e and the second electrode 57e. In other words, when a top surface 45S of the pressing member 4 is viewed from the front, the first electrode 56e and the second electrode 57e are located at the inner side than a range surrounded by an edge of the top surface. When the top surface 45S of the pressing member 4 is viewed from the front, the pressing portion 46 is located at the inner side than a range surrounded by side surfaces of the electrodes in a direction orthogonal to a thickness direction of the first electrode 56e and the second electrode 57e.

In addition, the top wall 45 of the pressing member 4 is provided with a plurality of ribs 49 protruding from the same bottom surface as the side provided with the pressing portion 46. These ribs 49 are formed at positions overlapping with the plurality of through-holes 20H formed in the placement portion 21 of the pedestal 2. In a state where the pressing member 4 covers the load detection sensor 5 placed on the placement portion 21 of the pedestal 2 and the respective hook pieces 47 are fitted into the respective hook openings 24, the respective ribs 49 are inserted into the corresponding through-holes 20H. As a result, even if the entire sheet surface of the load detection sensor 5 is not adhered to the placement portion 21, the relative movement of the load detection sensor 5 and the pressing portion 46 of the pressing member 4 in the direction of the placement surface 21S is regulated. In a state where the pressing member 4 covers the load detection sensor 5 placed on the placement portion 21 and the corresponding hook pieces 47 are fitted into the respective hook openings 24, the tip of the pressing portion 46 contacts the load detection sensor 5.

The pressing member 4 is formed of a material harder than the seat cushion SC. Therefore, the pressing portion 46 to be a part of the pressing member 4 is also formed of a material harder than the seat cushion SC. Generally, because the seat cushion SC is made of a foamed urethane resin, examples of a material of the pressing member 4 include a resin such as polycarbonate (PC), polyamide (PA), PBT, a phenol resin, and an epoxy resin.

In a state where the load detection sensor unit 1A is attached to the pair of S springs 100, the top surface 45S of the top wall 45 of the pressing member 4 faces a bottom surface of the seat cushion SC with a predetermined distance. The top surface 45S has a planar shape. The top surface 45S is a pressure reception surface receiving the pressing force from the seat cushion SC and an area of the top surface 45S is larger than an area of a contact portion with the metal plate 60 of the load detection sensor 5 in the pressing portion 46.

Next, the load detection sensor 5 will be described in more detail.

Figure 4:
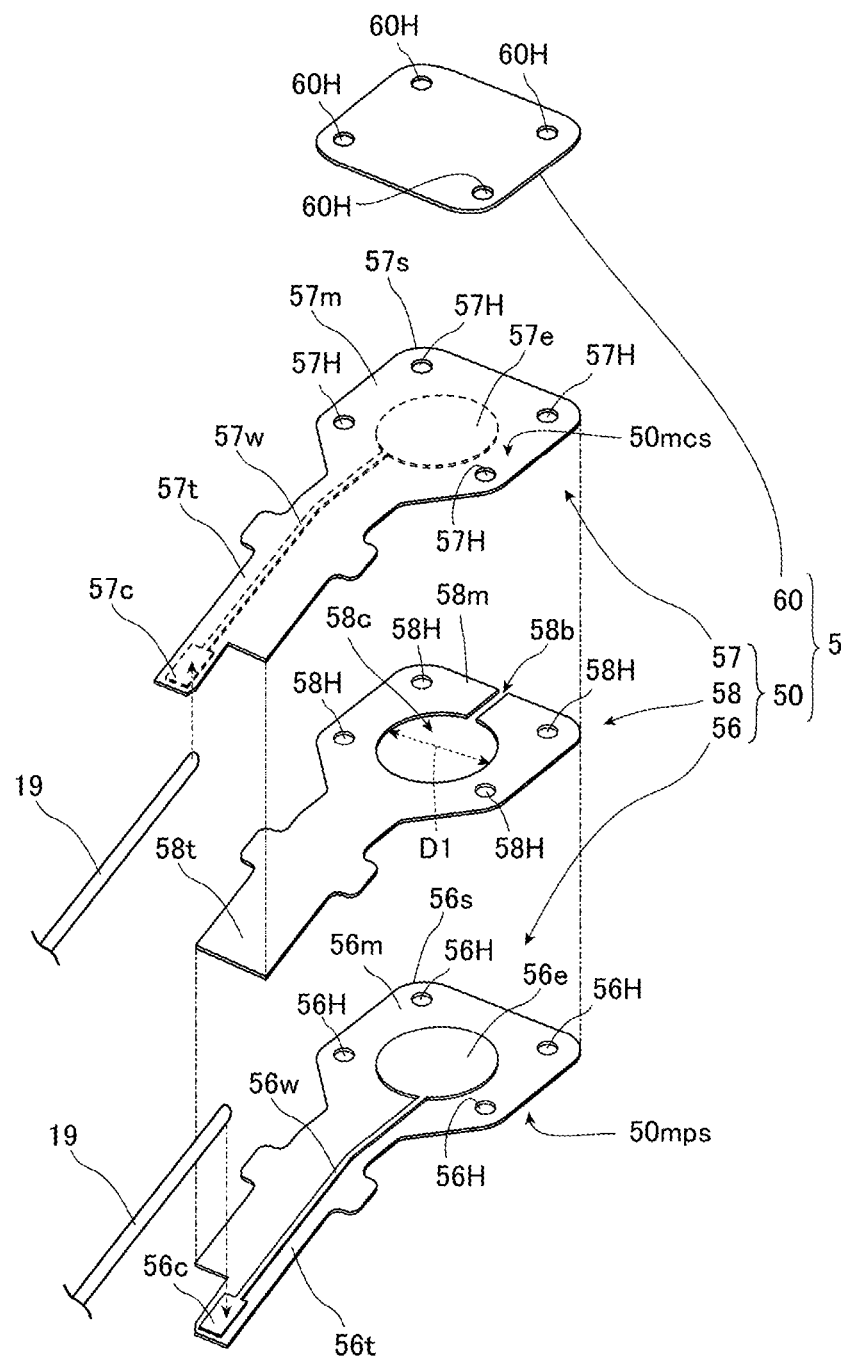
FIG. 4 is an exploded view of a load detection sensor.

FIG. 4 is an exploded view of the load detection sensor 5. As shown in FIG. 4, the sensor sheet 50 includes a first electrode sheet 56, a spacer 58, and a second electrode sheet 57. The first electrode sheet 56 has a first insulating sheet 56s, a first electrode 56e, and a first terminal 56c as a main configuration.

The first insulating sheet 56s is an insulating sheet made of a flexible resin. The first insulating sheet 56s includes a main block 56m that has the same shape as the main block 50m of the sensor sheet 50 and a tail block 56t that is connected to the main block 56m and has substantially the same shape as the tail block 50t of the sensor sheet 50. The shape of the tail block 56t is different from the shape of the tail block 50t of the sensor sheet 50 in that a tip portion of the side opposite to the main block 56m is narrower than the other portion of the tail block 56t. In addition, the main block 56m is provided with through-holes 56H at the same positions as the through-holes 50H of the sensor sheet 50. Examples of a material of the first insulating sheet 56s can include a resin such as PET, polyimide (PI), or polyethylene naphthalate (PEN). The surface of the main block 56m of the first insulating sheet 56s opposite to the side facing the spacer 58 is the pedestal facing surface 50mps of the main block 50m in the sensor sheet 50 as described above (FIG. 2).

The first electrode 56e is provided on one surface at approximately the center of the main block 56m. The first electrode 56e is made of a conductor layer and is, for example, a substantially circular metal printing layer. The first terminal 56c is made of a conductor layer and is, for example, a substantially rectangular metal layer. The first terminal 56c is provided on a surface of the tip portion of the tail block 56t at the side where the first electrode 56e is provided. In addition, the first electrode 56e and the first terminal 56c are electrically connected to each other via a first wiring line 56w.

The second electrode sheet 57 has a second insulating sheet 57s, a second electrode 57e, and a second terminal 57c as a main configuration.

The second insulating sheet 57s is disposed closer to the seat cushion SC than the first electrode sheet 56 (FIG. 2) and is an insulating sheet made of a resin, similarly to the first insulating sheet 56s. In the case of this embodiment, the second insulating sheet 57s includes a main block 57m that has the same shape as the main block 56m of the first insulating sheet 56s and a tail block 57t that is connected to the main block 57m and has the same shape as the tail block 56t of the first insulating sheet 56s, except for a tip portion. The tip portion of the tail block 57t is narrower than the other portion of the tail block 57t. When the first insulating sheet 56s and the second insulating sheet 57s are stacked, the tip portion in the tail block 56t of the first insulating sheet 56s and the tip portion in the tail block 57t of the second insulating sheet 57s do not overlap with each other. In addition, the main block 57m is provided with through-holes 57H at the same positions as the through-holes 50H of the sensor sheet 50, similarly to the first insulating sheet 56s. Similarly to the first insulating sheet 56s, examples of a material of the second insulating sheet 57s can include a resin such as PET, PI, or PEN. The material of the second insulating sheet 57s may be the same as or different from the material of the first insulating sheet 56s.

The second electrode 57e is an electrode forming a pair with the first electrode 56e and has the same configuration as the first electrode 56e. The second electrode 57e is provided on one surface at approximately the center of the main block 57m of the second insulating sheet 57s. In addition, a position where the second electrode 57e is provided is a position overlapping with the first electrode 56e when the first electrode sheet 56 and the second electrode sheet 57 are stacked. The second terminal 57c has the same configuration as the first terminal 56c and is provided on a surface of the tip portion of the tail block 57t at the side where the second electrode 57e is provided. As described above, when the first insulating sheet 56s and the second insulating sheet 57s are stacked, the tip portions of the respective insulating sheets do not overlap with each other, so that the first terminal 56c and the second terminal 57c are not located between the first insulating sheet 56s and the second insulating sheet 57s and are exposed. In addition, the second electrode 57e and the second terminal 57c are electrically connected to each other via a second wiring line 57w.

The spacer 58 is an insulating sheet that is disposed between the first electrode sheet 56 and the second electrode sheet 57 and is made of a flexible resin. The spacer 58 includes a main block 58m and a tail block 58t connected to the main block 58m. An outer shape of the main block 58m is the same as outer shapes of the main blocks 56m and 57m of the first insulating sheet 56s and the second insulating sheet 57s. An opening 58c is formed in a center of the main block 58m. In addition, the main block 58m is provided with through-holes 58H at the same positions as the through-holes 50H of the sensor sheet 50, similarly to the first insulating sheet 56s and the second insulating sheet 57s. The tail block 58t is formed in a shape in which the narrow tip portion is removed from each of the tail blocks 56t and 57t of the first insulating sheet 56s and the second insulating sheet 57s.

The opening 58c has a substantially circular shape and is formed to have a diameter slightly smaller than the diameter of each of the first electrode 56e and the second electrode 57e. In the case of this embodiment, an area of a plane at the tip of the pressing portion 46 is preferably 3.0 mm² or more. In addition, an outer shape of the plane at the tip of the pressing portion 46 is a substantially circular shape and a diameter D2 of the plane is preferably 2.0 mm or more. In addition, the area of the plane at the tip of the pressing portion 46 with respect to the area of the opening 58c is preferably 0.8 times or less. When both the shape of the opening 58c and the outer shape of the plane at the tip of the pressing portion 46 are substantially circular, the diameter D2 of the plane at the tip of the pressing portion 46 with respect to the diameter D1 of the opening 58c is preferably 0.8 times or less.

The opening 58c is formed such that the opening 58c is located at the inner side of circumference of the first electrode 56e and the second electrode 57e, when the spacer and the first electrode sheet 56 and the second electrode sheet 57 are stacked and the spacer 58 is viewed in a plan view. The spacer 58 is provided with a slit 58b that connects a space in the opening 58c and an external space of the sensor sheet 50. The slit 58b is an air vent when the first electrode sheet 56, the spacer 58, and the second electrode sheet 57 are overlapped. The opening 58c may be formed to be located at the outer side of the circumference of the first electrode 56e and the second electrode 57e, when the spacer 58 and the first electrode sheet 56 and the second electrode sheet 57 are stacked and the spacer 58 is viewed in a plan view.

Similarly to the first insulating sheet 56s and the second insulating sheet 57s, examples of a material of the spacer 58 can include a resin such as PET, PI, or PEN. The material of the spacer 58 may be the same as or different from the material of the first insulating sheet 56s or the second insulating sheet 57s. In addition, an adhesive not shown in the drawings to adhere the spacer 58 to the first electrode sheet 56 and the second electrode sheet 57 is applied to both surfaces of the spacer 58.

In a state where the first electrode sheet 56, the spacer 58, and the second electrode sheet 57 are adhered in this order, the first electrode 56e and the first wiring line 56w of the first electrode sheet 56 and the second electrode 57e and the second wiring line 57w of the second electrode sheet 57 are located between the first insulating sheet 56s and the second insulating sheet 57s. In addition, the first electrode 56e and the second electrode 57e face each other with the opening 58c therebetween, thereby constituting the switch SW. In a state where the first electrode sheet 56, the spacer 58, and the second electrode sheet 57 are stacked, the through-holes 56H, 57H, and 58H overlap with each other and become the through-holes 50H of the sensor sheet 50.

In addition, signal cables 19 connected to a control device not shown in the drawings are connected to the first terminal 56c and the second terminal 57c of the sensor sheet 50, respectively. The first terminal 56c and the second terminal 57c and the respective signal cables 19 are connected by conductive paste, soldering, or the like. An end portion of the tail block 50t of the sensor sheet 50 including the first terminal 56c and the second terminal 57c to which the signal cables 19 are connected is covered by a terminal sealing resin 18, as shown in FIG. 1. The terminal sealing resin 18 is made of, for example, a hot melt, a photocurable resin, or the like. In this way, the respective signal cables 19 are suppressed from being detached from the first terminal 56c and the second terminal 57c and the first terminal 56c and the second terminal 57c are suppressed from short-circuiting due to conductive dust or the like.

The metal plate 60 is made of a metal plate having flexibility to the extent that it is hard to be bent as compared with the sensor sheet 50. A material of the metal plate 60 is not particularly limited as long as it is a metal having conductivity and examples thereof include copper, stainless steel, and the like. In the case of this embodiment, the metal plate 60 has substantially the same shape as the main block 50m of the sensor sheet 50.

The metal plate 60 is provided with through-holes 60H at the same positions as the through-holes 50H of the sensor sheet 50. When the sensor sheet 50 and the metal plate 60 are stacked, the through-holes 50H of the sensor sheet 50 and the through-holes 60H of the metal plate 60 overlap with each other. In addition, when the sensor sheet 50 and the metal plate 60 are stacked, the metal plate 60 is attached to the cushion side surface 50mcs via the adhesive layer 70 to cover the switch SW including the first electrode 56e and the second electrode 57e of the sensor sheet 50.

The load detection sensor 5 having the above configuration is disposed on the placement portion 21 of the pedestal 2, as shown in FIG. 2. Specifically, the main block 50m of the sensor sheet 50 having the first electrode 56e and the second electrode 57e is located on the placement portion 21 of the pedestal 2. In addition, the tail block 50t of the sensor sheet 50, the terminal sealing resin 18, and the pair of signal cables 19 is led out from the pedestal 2.

As described above, in a state in which the pressing member 4 covers the load detection sensor 5 placed on the pedestal 2 and the respective hook pieces 47 are fitted into the respective hook openings 24, the tip of the pressing portion 46 contacts a position overlapping with the first electrode 56e and the second electrode 57e in the metal plate 60 of the load detection sensor 5. In this state, the ribs 49 are inserted into the through-holes 60H of the metal plate 60, the through-holes 50H of the sensor sheet 50, and the through-holes 20H of the pedestal 2 corresponding to the ribs 49. Therefore, even in a state where the pedestal 2 and the first insulating sheet 56s are not adhered, the relative movement of the load detection sensor 5 and the pressing portion 46 of the pressing member 4 is regulated. That is, the rib 49 can be understood as a movement regulation member that regulates the relative movement of the sensor sheet 50 and the pedestal 2 in a direction of the pedestal facing surface 50mps.

Next, detection of seating by the load detection sensor unit 1A according to this embodiment will be described.

Figure 5:
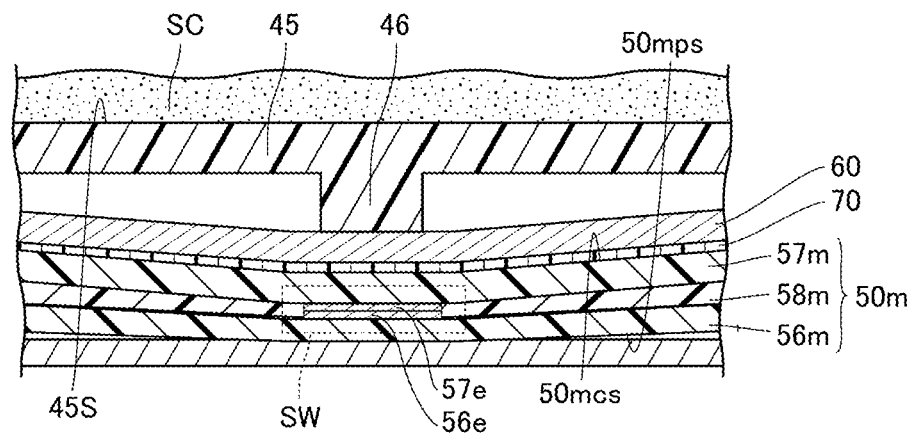
FIG. 5 is a diagram showing an aspect of an on-state of the load detection sensor.

FIG. 5 is a diagram showing an on-state of the load detection sensor 5. If a person sits on the seat device, the bottom surface of the seat cushion SC moves downward and the bottom surface of the seat cushion SC contacts the top surface 45S of the pressing member 4 to press the top surface 45S. If the bottom surface of the seat cushion SC further moves downward, as shown in FIG. 5, the tip of the pressing portion 46 presses the metal plate 60 and the main block 57m of the second insulating sheet 57s is also bent due to bending of the metal plate 60. At this time, because the pedestal facing surface 50mps of the main block 56m of the first insulating sheet 56s is not adhered to the pedestal 2, at least a peripheral portion of the first electrode 56e and the second electrode 57e is deformed to follow bending of the metal plate 60. As a result, the second electrode 57e contacts the first electrode 56e, the load detection sensor 5 is turned on, and the load is detected. In addition, seating is detected by a vehicle control unit not shown in the drawings that is connected to the signal cable 19.

As described above, the sensor sheet 50 made of the resin in the load detection sensor unit 1A according to this embodiment is provided with the switch SW including the pair of electrodes 56e and 57e separated from each other. The cushion side surface 50mcs to be one surface of the sensor sheet 50 and the metal plate 60 are bonded by the adhesive layer 70 and the pressing portion 46 is disposed between the seat cushion SC of the seat device and the metal plate 60.

When the metal plate 60 is pressed by the pressing portion 46, the metal plate 60 is bent, the sensor sheet 50 made of the resin is pressed, the sensor sheet 50 is bent, the pair of electrodes 56e and 57e separated from each other contacts each other, the load detection sensor 5 is turned on, and the load is detected.

Because the pressing portion 46 is harder than the seat cushion and the metal plate 60 is pressed by the pressing portion 46, the metal plate 60 can be appropriately bent as compared with the case where the metal plate 60 is pressed directly by the seat cushion SC, and seating can be appropriately detected.

In addition, a metal is less likely to cause creeping as compared with the resin. For this reason, even when the metal plate 60 is pressed by the pressing portion 46, it is difficult for the metal plate 60 to acquire a pressing habit. Therefore, in the load detection sensor unit 1A, erroneous detection of seating due to the pressing habit can be suppressed and as a result, seating can be appropriately detected.

Incidentally, in the resin, because flexibility changes easily according to a change in environmental temperature as compared with the metal, creeping tends to occur easily and the acquisition of the bending habit tends to occur easily. However, in the load detection sensor unit 1A, the metal plate 60 and one surface of the sensor sheet 50 made of the resin are bonded by the adhesive layer 70. For this reason, when pressing by the pressing portion 46 is released and the metal plate 60 returns to a position at the time of non-pressing, the metal plate 60 can return the sensor sheet 50 made of the resin to the position. Therefore, in the load detection sensor unit 1A, even when the environmental temperature around the load detection sensor unit 1A changes, it is difficult for the sensor sheet 50 made of the resin to acquire the pressing habit and the erroneous detection of the seating due to the pressing habit can be suppressed. As a result, the seating can be appropriately detected.

In the load detection sensor unit 1A according to this embodiment, in the main block 50m of the sensor sheet 50 disposed on the pedestal 2, the entire pedestal facing surface 50mps facing the pedestal 2 is not adhered to the pedestal 2. At least a peripheral portion of the region overlapping with the first electrode 56e and the second electrode 57e in the pedestal facing surface 50mps of the main block 50m is easily deformed to float. Therefore, a circumferential portion to be at least the peripheral portion of the first electrode 56e and the second electrode 57e is easily deformed to follow the bending of the metal plate 60 (FIG. 4) and as a result, the seating can be appropriately detected.

As described above, in the load detection sensor unit 1A according to this embodiment, the sensor sheet 50 is easily deformed to follow the metal plate 60 at the time of pressing, while the sensor sheet 50 is easily deformed to return to an original position by the metal plate 60 at the time of non-pressing.

In addition, in the load detection sensor unit 1A according to this embodiment, the rib 49 that regulates the relative movement of the main block 50m and the pedestal 2 in the direction of the pedestal facing surface 50mps is provided.

Therefore, even if the entire main block 50m disposed on the pedestal 2 is not adhered, a misalignment of the main block 50m with respect to the pedestal 2 is suppressed and it is possible to suppress the misalignment of the main block 50m with respect to the pedestal 2. Therefore, it is possible to suppress a failure in which the load detection sensor 5 is not turned on, even when the load detection sensor 5 is pressed by the pressing portion 46.

In addition, in the load detection sensor unit 1A according to this embodiment, because the rib 49 is inserted into the through-hole 50H formed in the sensor sheet 50 and the through-hole 20H formed in the pedestal 2, the misalignment of the sensor sheet 50 with respect to the pedestal 2 is easily suppressed.

In addition, in the load detection sensor unit 1A according to this embodiment, the rib 49 is a part of the pressing member 4.

For this reason, a deviation of a positional relation between the pressing portion 46 in the pressing member 4 and the first electrode 56e and the second electrode 57e is suppressed and it is possible to suppress the failure in which the load detection sensor 5 is not turned on, even when the load detection sensor 5 is pressed by the pressing portion 46. In addition, the part of the pressing member 4 becomes the rib 49, so that the misalignment of the main block 50m with respect to the pedestal 2 can be suppressed without separately providing a movement regulation member besides the pressing member 4, even when the entire main block 50m disposed on the pedestal 2 is not adhered. Therefore, when the load detection sensor unit 1A has the pressing member 4 as in this embodiment, the configuration of the load detection sensor unit 1A can be simplified.

In addition, in the load detection sensor unit 1A according to this embodiment, the pressing member 4 has the top wall 45 that has an area larger than the contact area of the pressing portion 46 with respect to the metal plate 60 and receives the pressing force from the seat cushion SC.

Because the area of the top wall 45 pressed by the seat cushion SC is larger than the area of the pressing portion 46 contacting the metal plate 60, the pressing force from the seat cushion SC can be concentrated on the pressing portion 46 by the top wall 45 and the metal plate 60 can be more appropriately bent. Therefore, according to the pressing member 4, the first electrode 56e and the second electrode 57e of the sensor sheet 50 can be protected and the seating can be more appropriately detected.

In addition, in the load detection sensor unit 1A according to this embodiment, the area of the top wall 45 is larger than the areas of the first electrode 56e and the second electrode 57e pressed by the pressing portion 46. For this reason, the seat cushion SC can transmit the force to the top wall 45 from positions other than directly above the pair of electrodes 56e and 57e. Therefore, the pressing force can be more appropriately concentrated on the pressing portion 46 and the metal plate 60 can be more appropriately bent. As a result, the seating can be more appropriately detected.

In addition, in the load detection sensor unit 1A according to this embodiment, the pressing portion 46 has a smaller area than the first electrode 56e and the second electrode 57e. Therefore, the pressing force concentrated by the top wall 45 of the pressing member 4 can be transmitted to the first electrode 56e and the second electrode 57e without being dispersed to the pressing portion 46.

In addition, in the load detection sensor unit 1A according to this embodiment, the tip of the pressing portion 46 has a planar shape. In the case where the tip of the pressing portion 46 has a planar shape, the pressing force received by the load detection sensor 5 from the pressing portion 46 is dispersed as compared with the case where the tip has a convex curved surface shape, so that the adhesive layer 70 of the load detection sensor 5 hardly escapes laterally by pressing of the pressing portion 46. Therefore, it is difficult for the adhesive layer 70 to acquire the pressing habit. As a result, acquisition of the pressing habit in the metal plate 60 is also reduced by making the metal plate 60 follow the adhesive layer 70.

Figure 6:
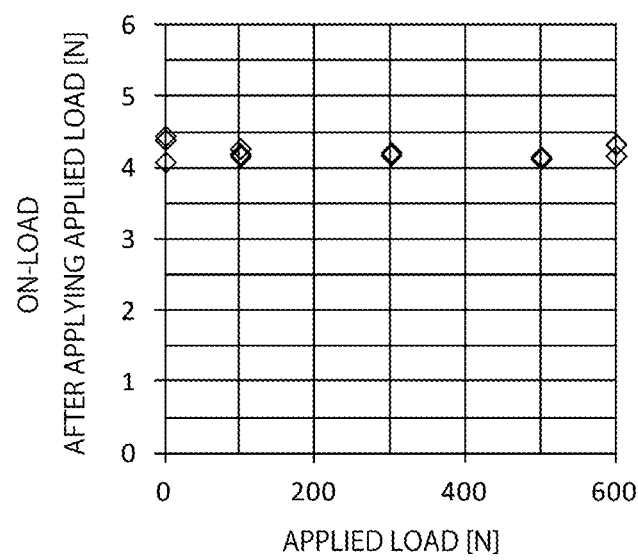
FIG. 6 is a graph showing an experimental result in the case where the load detection sensor is pressed by a pressing portion of which a tip has a planar shape.
Figure 7:
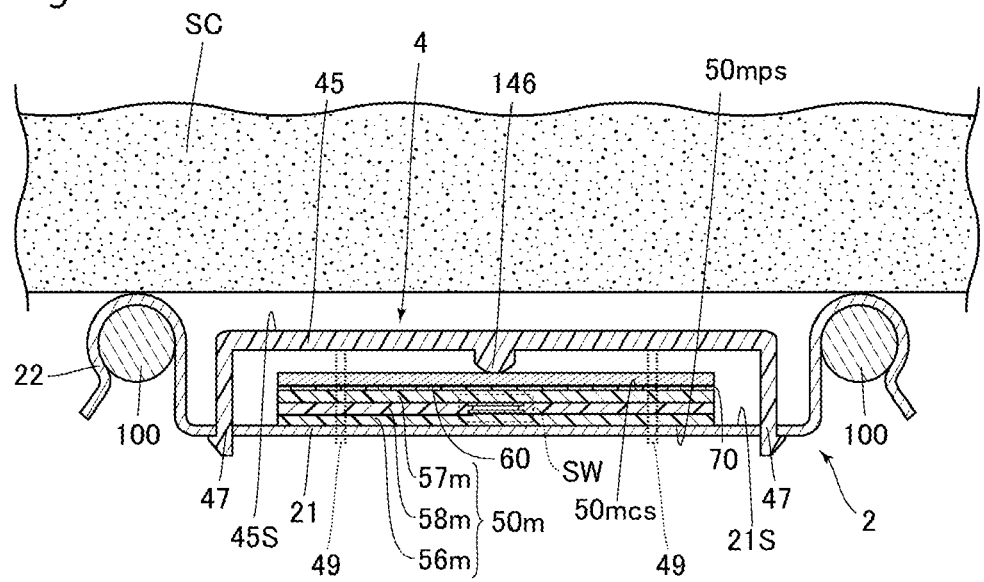
FIG. 7 is a diagram showing the load detection sensor unit having a pressing portion of which a tip has a convex curved surface shape from the same viewpoint as FIG. 2.
Figure 8:
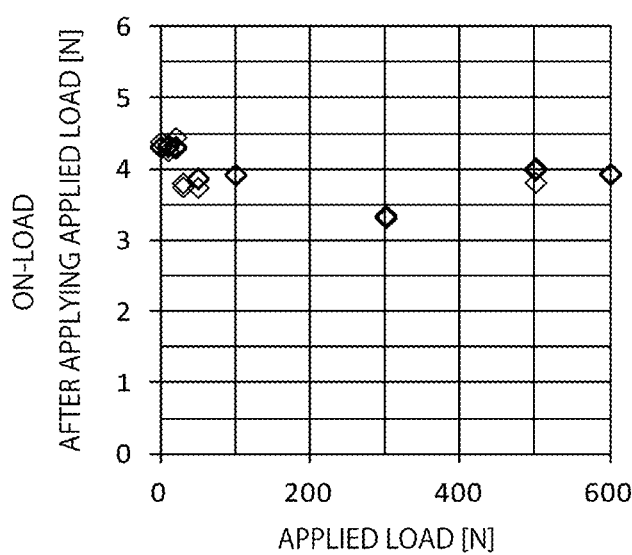
FIG. 8 is a graph showing an experimental result in the case where the load detection sensor is pressed by a pressing portion of which a tip has a convex curved surface shape.

Here, an experimental result in the case where the load detection sensor 5 is pressed by the pressing portion 46 according to this embodiment in which the tip has a planar shape is shown in FIG. 6. In addition, an experimental result in the case where a pressing portion 146 of which a tip has a convex curved surface shape is adopted as shown in FIG. 7, instead of the pressing portion 46 according to this embodiment, and the load detection sensor 5 is pressed by the pressing portion 146 is shown in FIG. 8. In an experiment method, after applying a predetermined applied load to the load detection sensor 5 for one second in an environment of 25° C., the load is again applied to the load detection sensor 5 and the load (on-load) when the pair of electrodes 56e and 57e contacts is measured. The applied load is increased continuously by 10 N from a no-load state (0 N) and the on-load is measured for each applied load. In addition, the number of times of measuring the on-load is set to 3 times. As shown in FIGS. and 8, it can be understood that, when the pressing portion 46 of which the tip has a planar shape is applied, variations in the on-load are smaller than those in the case where the pressing portion 146 of which the tip has a convex curved surface shape is applied and it is difficult for the adhesive layer 70 or the metal plate 60 of the load detection sensor 5 to acquire the pressing habit.

Incidentally, the load applied to the load detection sensor unit 1A is about 20 N as a weight when a heavy man (95% men from the lower side in statistics of weights of men) sits. When the load of about 20 N is applied to the load detection sensor unit 1A, the excessive force is applied to the metal plate 60 from the pressing portion 46 and a portion of the metal plate 60 pressed by the pressing portion 46 may cause plastic deformation. In this case, the on-load decreases and the load cannot be appropriately detected.

In the case of this embodiment, an area of a plane at the tip of the pressing portion 46 is 3.0 mm$^2$ or more. In addition, an outer shape of the plane at the tip of the pressing portion 46 is a substantially circular shape and a diameter D2 of the plane is 2.0 mm or more. In this case, a failure in which the pressing force is excessively dispersed and the load detection sensor 5 is not turned on can be prevented while the plastic deformation of the portion of the metal plate 60 pressed by the pressing portion 46 is further suppressed.

In the case of this embodiment, the area of the plane at the tip of the pressing portion 46 with respect to the area of the opening 58c is 0.8 times or less. In addition, the diameter D2 of the plane at the tip of the pressing portion 46 with respect to the diameter D1 of the opening 58c is 0.8 times or less. In this case, it is possible to suppress that the pressing portion 46 is excessively large and the pressing force is dispersed and it is possible to suppress the failure in which the load detection sensor 5 is not turned on.

(2) Second Embodiment

Next, a second embodiment of the present invention will be described. In describing this embodiment, components that are the same as or equivalent to those in the first embodiment will be denoted by the same reference numerals and redundant explanation will be omitted except when particularly described.

In the first embodiment, in a main block 50m disposed on a pedestal 2, an entire pedestal facing surface 50mps of the main block 50m facing a placement surface 21S of a placement portion 21 is not adhered to the placement portion 21. On the other hand, in this embodiment, in the main block 50m, a part of the pedestal facing surface 50mps is adhered to the placement portion 21.

Figure 9:
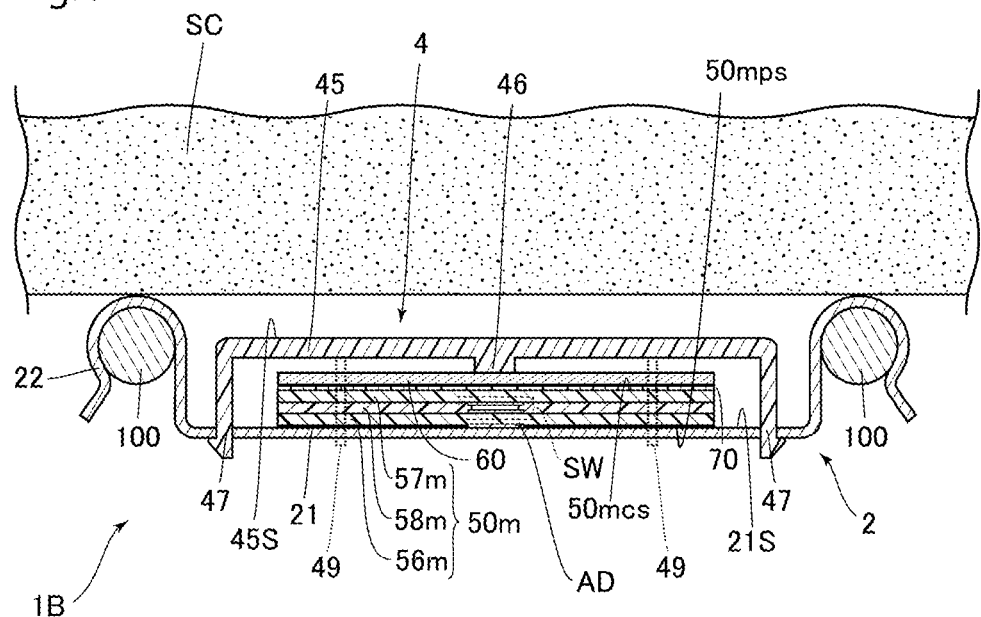
FIG. 9 is a diagram showing a load detection sensor unit according to a second embodiment from the same viewpoint as FIG. 2.
Figure 10:
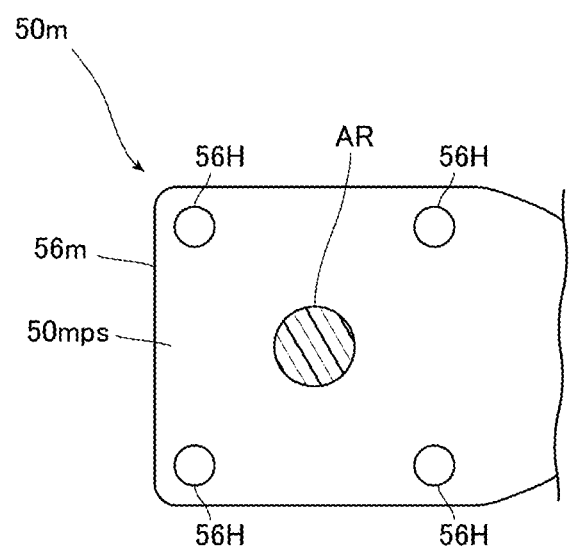
FIG. 10 is a diagram showing an aspect where a part of a first insulating sheet is front-viewed from the side of a facing surface facing a placement surface of a pedestal.

FIG. 9 is a diagram showing a load detection sensor unit 1B according to the second embodiment from the same viewpoint as FIG. 2 and FIG. 10 is a diagram showing an aspect where a part of a first insulating sheet 56s is front-viewed from the side of the pedestal facing surface 50mps facing the placement surface 21S of the pedestal 2. A part of the first insulating sheet 56s is specifically the main block 56m.

As shown in FIGS. 9 and 10, in the load detection sensor unit 1B according to this embodiment, in the main block 50m, a region AR (FIG. 10) overlapping with a first electrode 56e and a second electrode 57e of a sensor sheet 50 in a thickness direction of the sensor sheet 50 in the pedestal facing surface 50mps is adhered by an adhesive AD (FIG. 9). In addition, the entire pedestal facing surface 50mps other than the region AR is not adhered. When the sensor sheet 50 is front-viewed from the side of the pedestal facing surface 50mps facing the placement surface 21S of the pedestal 2, the adhesive AD is located at the inner side than an edge of the main block 50m disposed on the pedestal 2 in the sensor sheet 50. In addition, when it is assumed that the first electrode 56e and the second electrode 57e of the sensor sheet 50 move along the thickness direction of the first electrode 56e and the second electrode 57e, it is substantially matched with the adhesive AD (FIG. 9) on the pedestal facing surface 50mps.

As such, when the region AR overlapping with the first electrode 56e and the second electrode 57e is adhered, a misalignment of the main block 50m with respect to the pedestal 2 is suppressed. For this reason, even if a rib is omitted, it is possible to suppress relative positions of the main block 50m and a metal plate 60 from being shifted due to the misalignment of the main block 50m with respect to the pedestal 2. Therefore, it is possible to suppress a failure in which a load detection sensor 5 is not turned on, even when the metal plate 60 is pressed by a pressing portion 46. On the other hand, the entire pedestal facing surface 50mps other than the region AR overlapping with the first electrode 56e and the second electrode 57e is not adhered. Therefore, as described above, the entire main block 50m disposed on the pedestal 2 is easily deformed to follow bending of the metal plate 60 and erroneous detection of seating due to difficulty in the deformation of the main block 50m can be suppressed.

(3) Modification

Although the load detection sensor unit according to the present invention has been described using the embodiments as examples, the present invention is not limited to the embodiments.

For example, in the embodiments, the metal plate 60 is attached to the cushion side surface 50mcs of the main block 50m to be a part of the sensor sheet 50. However, the metal plate 60 may be attached to a portion including the main block 50m and a part of the tail block 50t in one surface becomes the side of the seat cushion SC in the sensor sheet 50 and the metal plate 60 may be attached to the entire surface of one surface. In other words, the metal plate may be attached to at least a portion overlapping with the first electrode 56e and the second electrode 57e in one surface becoming the side of the seat cushion SC in the sensor sheet 50 when one surface is viewed from the front.

In addition, in the embodiments, the main block 50m including the first electrode 56e and the second electrode 57e and wider than the first electrode 56e and the second electrode 57e is disposed on the pedestal 2. However, the main block 50m and a part of the tail block 50t may be disposed on the pedestal 2 and the entire sensor sheet 50 may be disposed on the pedestal 2. In the embodiments, the pedestal is the pedestal 2 to dispose the sensor sheet 50 between the pair of S springs 100. However, the pedestal is not limited to the pedestal 2. As long as at least the portions of the first electrode 56e and the second electrode 57e can be disposed, various members such as a seat pan and a part of a vehicle body can be used as the pedestal.

In the first embodiment of the embodiments, in the main block 50m disposed on the pedestal 2, the entire pedestal facing surface 50mps of the main block 50m facing the placement surface 21S of the placement portion 21 is not adhered to the placement portion 21. On the other hand, in the second embodiment, in the main block 50m, the region AR overlapping with the first electrode 56e and the second electrode 57e in the pedestal facing surface 50mps is adhered and the entire pedestal facing surface 50mps other than the region AR is not adhered. However, for example, the entire main block 50m disposed on the pedestal 2 may be adhered to the pedestal 2. In the case where the peripheral portion of the first electrode 56e and the second electrode 57e is easily deformed to follow bending of the metal plate 60, preferably, the circumferential portion to be at least the peripheral portion of the region overlapping with the first electrode 56e and the second electrode 57e is not adhered to the pedestal 2.

In addition, in the embodiments, the relative movement of the sensor sheet 50 and the metal plate 60 in the plane direction is regulated by the rib 49. However, the rib 49 is not indispensable. In this case, for example, as described above, the region AR overlapping with the first electrode 56e and the second electrode 57e in the main block 50m may be adhered.

In addition, in the embodiments, the pressing portion of the pressing member 4 and the top wall 45 are integrally molded. However, the pressing portion 46 may be provided separately from the top wall 45 and may be attached to the top wall 45 or the like.

In addition, in the embodiments, the tip of the pressing portion 46 has a planar shape. However, the tip of the pressing portion 46 may have a convex curved surface shape as shown in FIG. 7. When the tip of the pressing portion 46 has a convex curved surface shape, the pressing force applied from the pressing portion 46 to the load detection sensor 5 can be concentrated, as compared with the case where the tip thereof has a planar shape. Therefore, even in a state where the pressing force received from the pressing portion 46 is difficult to transmit to the load detection sensor 5, such as when the metal plate 60 in the load detection sensor 5 becomes thick, the load can be appropriately detected.

This effect is particularly effective at the time of an operation in a low-temperature environment. It is known that the adhesive layer 70 is hardened and the elastic modulus thereof is remarkably increased in the low-temperature environment. In particular, when the temperature is equal to or lower than the glass transition point of the adhesive layer 70, an influence of the elastic modulus of the adhesive layer 70 cannot be ignored. Because the elastic modulus of the adhesive layer 70 greatly changes depending on the temperature, to stabilize the on-load of the sensor, the influence of the elastic modulus of the adhesive layer 70 is preferably 10% or less. For example, when the elastic modulus of the adhesive layer 70 increases to about 20% of the elastic modulus of the second insulating sheet 57s in the low-temperature environment, the thickness of the adhesive layer 70 is required to be 0.8 times or less of the thickness of the second insulating sheet 57s. In other words, the effect when the tip has the convex curved surface shape can be expected to be large particularly when the temperature is equal to or lower than the glass transition point of the adhesive layer 70 and the thickness of the adhesive layer 70 is preferably set to 0.8 times or less of the thickness of the second insulating sheet 57s. In the case where the tip of the pressing portion 46 has a planar shape, although the effect is small as compared with the case where the tip has a convex curved surface shape, the thickness of the adhesive layer 70 is set to 0.8 times or less of the thickness of the second insulating sheet 57s, so that the on-load of the sensor can be stabilized.

On the other hand, the adhesive layer 70 is preferably 10 µm or more. In the high-temperature environment, the fluidity of the adhesive layer 70 increases. In this state, if the excessive pressing force is applied, the excessive pressing force may be applied to the adhesive layer 70 at the position overlapping with the pressing portion 46 to flow the adhesive layer 70 laterally, the thickness may be decreased by the constant thickness, the on-load may be lowered, the adhesive property may be impaired, and the electrodes may contact each other at all times. However, the adhesive layer 70 is set to 10 μm or more, so that it is possible to prevent the on-load of the load detection sensor 5 from being lowered and prevent the adhesive property from being impaired. In the case where the tip of the pressing portion 46 has a planar shape, although the effect is small as compared with the case where the tip has a convex curved surface shape, the adhesive layer 70 is set to 10 μm or more, so that it is possible to prevent the on-load of the load detection sensor 5 from being lowered and prevent the adhesive property from being impaired.

Figure 11:
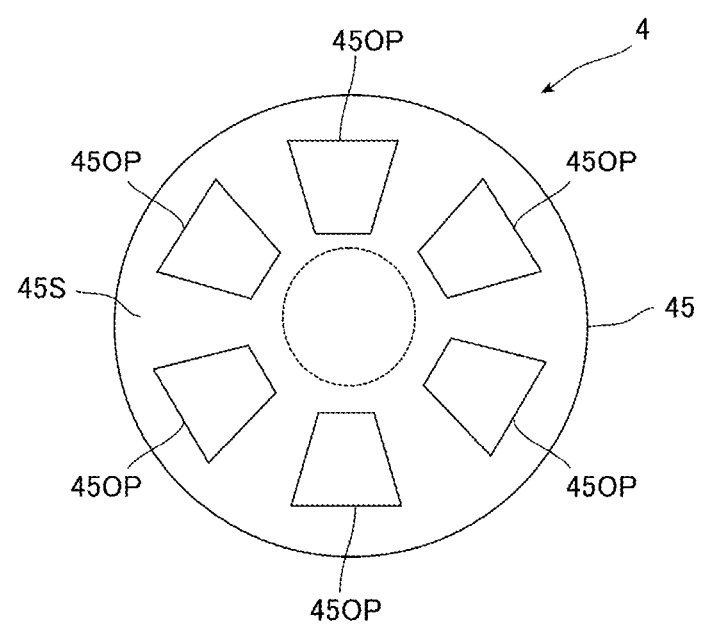
FIG. 11 is a diagram showing a pressing member according to other embodiment when viewed from the top surface side.

In addition, in the embodiments, the top wall 45 of the pressing member 4 is not provided with openings. However, as shown in FIG. 11, the top wall 45 of the pressing member 4 may be provided with openings 450P. The top wall 45 is easily bent by providing the openings 450P and the top wall 45 is deformed to press the pressing portion 46 against the metal plate 60. Therefore, the pressing force received by the top surface 45S of the pressing member 4 can be more easily transmitted by the pressing portion 46 and even when the portion of the pressing member 4 other than the top wall 45 is fixed, the load detection sensor 5 can be appropriately turned on. In the example of FIG. 11, the shape of the opening 450P when the pressing member 4 is front-viewed from the side of the top surface 45S is a trapezoidal shape and the six openings 450P are widened as they get away from the center portion of the top wall 45 and are provided radially from the center portion. However, the shape, number, and installation aspect of the openings 450P are not limited to the example of FIG. 11.

In addition, in the embodiments, the pressing portion 46 contacts the metal plate 60 in a state other than the time of detection of the seating where no external pressure is applied. However, the pressing portion 46 may be separated from the metal plate 60 in a state other than the time of detection of the seating where no external pressure is applied. Although the pressing portion 46 and the metal plate 60 are provided between the seat cushion SC and the sensor sheet, the surface of the sensor sheet 50 opposite to the seat cushion SC and the metal plate 60 may be bonded and the pressing portion 46 may be provided at the side of the metal plate 60 opposite to the sensor sheet 50 (the side opposite to the seat cushion SC). In this case, if the sensor sheet 50 and the seat cushion SC can be fixed, the pedestal 2 may not be provided.

In addition, in the embodiments, the top wall 45 of the pressing member 4 is separated from the seat cushion SC in a state other than the time of detection of the seating where no external pressure is applied. However, the top wall 45 of the pressing member 4 may contact the seat cushion SC in a state other than the time of detection of the seating where no external pressure is applied.

In addition, in the embodiments, the sensor sheet 50 has the switch SW, and is constituted by the pair of insulating sheets 56s and 57s facing each other, the spacer 58 disposed between the insulating sheets 56s and 57s and having the opening 58c, the first electrode 56e provided on the surface of the insulating sheet 56s which the insulating sheet 57s faces, and the second electrode 57e provided in the insulating sheet 57s in a state where the second electrode 57e forms a pair with the first electrode 56e and faces the first electrode 56e with the distance via the opening 58c. However, the configuration of the sensor sheet 50 is not limited to the embodiments.

For example, the first electrode 56e or the second electrode 57e in the sensor sheet 50 may include a first comb-like electrode piece and a second tooth-like electrode piece disposed to mesh with the first comb-like electrode piece with a gap.

For example, a sensor sheet in which the first electrode and the second electrode made of a material having a high resistance value such as carbon are respectively provided on the facing surfaces of the pair of insulating sheets 56s and 57s in a state where the first electrode and the second electrode contact each other via the opening 58c of the spacer 58 may be used. In this sensor sheet, if the pressing force is applied, the resistance value of the pair of electrodes decreases. When the resistance value changed as described above is less than a threshold value set as a resistance value when a predetermined load is received, it is detected that the load has been received.

For example, a sensor sheet in which the first electrode 56e and the second electrode 57e are respectively provided on the facing surfaces of the pair of insulating sheets 56s and 57s in a state where the first electrode 56e and the second electrode 57e contact each other via conductive rubber disposed in the opening 58c of the spacer 58 may be used. In this sensor sheet, when the pressing force is applied, the conductive rubber is displaced and the resistance value between the pair of electrodes 56e and 57e decreases. When the resistance value changed as described above is less than a threshold value set as a resistance value when a predetermined load is received, it is detected that the load has been received.

For example, the first comb-like electrode piece functioning as the first electrode and the second tooth-like electrode piece functioning as the second electrode are provided on the surface of one insulating sheet 56s facing the other insulating sheet 57s and the conductive rubber is provided on the surface of the other insulating sheet 57s facing one insulating sheet 56s. In addition, a sensor sheet in which the spacer 58 is provided between the pair of insulating sheets 56s and 57s such that the conductive rubber and the first comb-like electrode piece and the second tooth-like electrode piece face each other via the opening 58c may be used. In this sensor sheet, if the pressing force is applied, a contact area of the first comb-like electrode piece and the second tooth-like electrode piece increases and an output resistance value decreases and the conductive rubber is displaced and the resistance value between the first comb-like electrode piece and the second tooth-like electrode piece decreases. When the resistance value changed as described above is less than a threshold value set as a resistance value when a predetermined load is received, it is detected that the load has been received. The spacer 58 of the sensor sheet may be omitted.

For example, an electrostatic capacitive sensor sheet in which a flexible sheet-like spacer where the opening 58c is omitted is disposed between the pair of insulating sheets 56s and 57s and the first electrode 56e and the second electrode 57e facing each other with the spacer therebetween are provided on the surfaces of the corresponding insulating sheets 56s and 57s may be used. In this sensor sheet, if the pressing force is applied, the spacer is bent, the distance between the pair of electrodes 56e and 57e decreases, and the electrostatic capacitance generated between the electrodes 56e and 57e increases. When the electrostatic capacitance changed as described above is more than a threshold value set as the electrostatic capacitance when a predetermined load is received, it is detected that the load has been received.

In addition to the contents described in the embodiments and modifications, the components in the load detection sensor units 1A and 1B can be appropriately combined, omitted, and added to the known technology without departing from the object of the present application.

The present invention can be used as long as the load detection sensor unit is provided at a place to detect a load below the seat cushion. In the embodiments, the load detection sensor unit is disposed below the seat cushion of the seat of the vehicle and the seating of the person is detected. However, for example, the load detection sensor unit may be disposed below a seat cushion such as a caring bed and may detect the presence or absence of a person.

REFERENCE SIGNS LIST 1A, 1B . . . load detection sensor unit
2 . . . pedestal
4 . . . pressing member
5 . . . load detection sensor
46, 146 . . . pressing portion
49 . . . rib
50 . . . sensor sheet
56 . . . first electrode sheet
56e . . . first electrode
56s . . . first insulating sheet
57 . . . second electrode sheet
57e . . . second electrode
57s . . . second insulating sheet
58 . . . spacer
60 . . . metal plate
SC . . . seat cushion
SW . . . switch

The invention claimed is:

1. A load detection sensor unit that is disposed below a seat cushion, the load detection sensor unit comprising:
a load detection sensor that has a sensor sheet having a pair of resinous insulating sheets, a first electrode provided on one of surfaces facing each other in the pair of insulating sheets, and a second electrode disposed between the pair of insulating sheets and forming a pair with the first electrode, and a metal plate provided in at least a portion overlapping with the first electrode and the second electrode on one surface of the sensor sheet;
a pressing member that has a pressing portion disposed on the side of the metal plate opposite to the side of the sensor sheet and pressing the metal plate; and
a pedestal on which a block larger than at least the first electrode and the second electrode in the sensor sheet is disposed, wherein
the pressing portion is harder than the seat cushion and, the sensor sheet and the metal plate are bonded by an adhesive layer, and
wherein, in the sensor sheet, a circumferential portion of at least a region overlapping with the first electrode and the second electrode in a pedestal facing surface to be a surface opposite to a surface to which the metal plate is attached and facing the pedestal is not adhered to the pedestal.

2. The load detection sensor unit according to claim 1, wherein, in the sensor sheet disposed on the pedestal, the entire pedestal facing surface is not adhered to the pedestal.

3. The load detection sensor unit according to claim 1, wherein, in the sensor sheet disposed on the pedestal, the region is adhered to the pedestal and the entire pedestal facing surface other than the region is not adhered.

4. The load detection sensor unit according to claim 1, further comprising a movement regulation member that regulates a relative movement of the sensor sheet and the pedestal in a sheet surface direction of the sensor sheet.

5. The load detection sensor unit according to claim 4, wherein the movement regulation member is inserted into through-holes formed in the sensor sheet and the pedestal.

6. The load detection sensor unit according to claim 5, wherein the movement regulation member is a part of the pressing member.

7. The load detection sensor unit according to claim 1, wherein the pressing member has a top wall that has an area larger than a contact area of the pressing portion with respect to the metal plate and receives the pressing force from the seat cushion.

8. The load detection sensor unit according to claim 7, wherein the top wall has a larger area than the first electrode and the second electrode, and
the pressing portion has a smaller area than the first electrode and the second electrode.

9. The load detection sensor unit according to claim 1, wherein a thickness of the adhesive layer is 10 µm or more and is 0.8 times or less of a thickness of the insulating sheet contacting the adhesive layer in the pair of insulating sheets.

10. The load detection sensor unit according to claim 1, wherein a tip of the pressing portion has a convex curved surface shape.

11. The load detection sensor unit according to claim 1, wherein a tip of the pressing portion has a planar shape.

12. The load detection sensor unit according to claim 11, wherein the sensor sheet further has a spacer provided with openings corresponding to the pair of electrodes between the pair of insulating sheets, and
an area of the planar shape of the tip of the pressing portion is 3.0 mm$^2$ or more and is 0.8 times or less of an area of the opening.

13. A load detection sensor unit that is disposed below a seat cushion, the load detection sensor unit comprising:
a load detection sensor that has a sensor sheet having a pair of resinous insulating sheets, a first electrode provided on one of surfaces facing each other in the pair of insulating sheets, and a second electrode disposed between the pair of insulating sheets and forming a pair with the first electrode, and a metal plate provided in at least a portion overlapping with the first electrode and the second electrode on one surface of the sensor sheet;
a pressing member that has a pressing portion disposed on the side of the metal plate opposite to the side of the sensor sheet and pressing the metal plate;
a pedestal on which a block larger than at least the first electrode and the second electrode in the sensor sheet is disposed; and
a movement regulation member that regulates a relative movement of the sensor sheet and the pedestal in a sheet surface direction of the sensor sheet, wherein
the pressing portion is harder than the seat cushion and, the sensor sheet and the metal plate are bonded by an adhesive layer.

14. The load detection sensor unit according to claim 13, wherein the movement regulation member is inserted into through-holes formed in the sensor sheet and the pedestal.

15. The load detection sensor unit according to claim 14, wherein the movement regulation member is a part of the pressing member.

16. A load detection sensor unit that is disposed below a seat cushion, the load detection sensor unit comprising:
a load detection sensor that has a sensor sheet having a pair of resinous insulating sheets, a first electrode provided on one of surfaces facing each other in the pair of insulating sheets, and a second electrode disposed between the pair of insulating sheets and forming a pair with the first electrode, and a metal plate provided in at least a portion overlapping with the first electrode and the second electrode on one surface of the sensor sheet; and a pressing member that has a pressing portion disposed on the side of the metal plate opposite to the side of the sensor sheet and pressing the metal plate, wherein the pressing portion is harder than the seat cushion and, the sensor sheet and the metal plate are bonded by an adhesive layer, and wherein the pressing member has a top wall that has an area larger than a contact area of the pressing portion with respect to the metal plate and receives the pressing force from the seat cushion.

17. The load detection sensor unit according to claim 16, wherein the top wall has a larger area than the first electrode and the second electrode, and the pressing portion has a smaller area than the first electrode and the second electrode.

\* \* \* \* \*